United States Patent
Kamiya et al.

(10) Patent No.: US 11,502,318 B2
(45) Date of Patent: Nov. 15, 2022

(54) FUEL CELL SYSTEM AND METHOD OF CONTROLLING FUEL CELL SYSTEM

(71) Applicant: TOYOTA JIDOSHA KABUSHIKI KAISHA, Toyota (JP)

(72) Inventors: Akihiro Kamiya, Nagoya (JP); Ryouichi Namba, Okazaki (JP); Masashi Toida, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 117 days.

(21) Appl. No.: 17/225,188

(22) Filed: Apr. 8, 2021

(65) Prior Publication Data
US 2021/0351422 A1    Nov. 11, 2021

(30) Foreign Application Priority Data
May 11, 2020  (JP) .............................. JP2020-083288

(51) Int. Cl.
   *H01M 8/04*       (2016.01)
   *H01M 8/0432*     (2016.01)
   *H01M 8/04858*    (2016.01)
   *H01M 8/04223*    (2016.01)

(52) U.S. Cl.
   CPC ..... *H01M 8/0432* (2013.01); *H01M 8/04253* (2013.01); *H01M 8/04873* (2013.01)

(58) Field of Classification Search
   CPC ........... H01M 8/0432; H01M 8/04253; H01M 8/04873
   USPC ......................................................... 429/442
   See application file for complete search history.

(56) References Cited

U.S. PATENT DOCUMENTS

| | | | |
|---|---|---|---|
| 2009/0004518 A1 | 1/2009 | Fujita | |
| 2010/0261077 A1* | 10/2010 | Ramaswamy | H01M 8/04268 429/428 |
| 2014/0220470 A1 | 8/2014 | Matsumoto et al. | |
| 2016/0133971 A1* | 5/2016 | Naganuma | H01M 8/04768 429/434 |
| 2020/0220184 A1* | 7/2020 | Shimada | B60L 58/25 |

FOREIGN PATENT DOCUMENTS

| | | | |
|---|---|---|---|
| JP | 2007287540 A | | 11/2007 |
| JP | 2013045514 A | | 3/2013 |
| JP | 2019091594 A | * | 6/2019 |

* cited by examiner

*Primary Examiner* — James M Erwin
(74) *Attorney, Agent, or Firm* — Dickinson Wright, PLLC

(57) ABSTRACT

A cooling water temperature of a fuel cell 10 is detected by a sensor 94d. Based on the outside air temperature, a first threshold temperature and a second threshold temperature lower than the first threshold temperature are calculated. When it is judged that the cooling water temperature is lower than the first threshold temperature and higher than the second threshold temperature, first warmup processing is performed. When it is judged that the cooling water temperature is lower than the second threshold temperature, second warmup processing with an amount of heat generation greater than the first warmup processing is performed.

12 Claims, 15 Drawing Sheets

FUEL CELL SYSTEM AND METHOD OF CONTROLLING FUEL CELL SYSTEM

FIELD

The present disclosure relates to a fuel cell system and a method of controlling a fuel cell system.

BACKGROUND

A fuel cell system is known in the art, which calculates an upper limit output value of a fuel cell based on a cooling water temperature of the fuel cell and performs a warmup operation when the upper limit output value is equal to or lower than a runnable output value (for example, see PTL 1). The upper limit output value of the fuel cell becomes lower, as the cooling water temperature becomes lower. Therefore, in PTL 1, it is believed that the warmup operation is performed when the cooling water temperature is equal to or lower than a temperature corresponding to the runnable output value.

CITATIONS LIST

Patent Literature

[PTL 1] Japanese Unexamined Patent Publication No. 2013-045514

SUMMARY

Technical Problem

In this regard, if considering ending antifreezing treatment reliably or early, it is preferable to make the amount of heat generation of the fuel cell increase when the cooling water temperature is relatively low, compared to when the cooling water temperature is relatively high. However, if making the amount of heat generation of the fuel cell increase just because the cooling water temperature is low, the energy consumed by the warmup processing may be excessively great. In PTL 1, this point is not disclosed at all.

Solution to Problem

According to the present disclosure, the following is provided.

Constitution 1

A fuel cell system, comprising
a fuel cell,
a sensor configured to detect a temperature of the fuel cell, and
a warmup control part configured to perform first warmup processing when it is judged that the temperature of the fuel cell is lower than a predetermined threshold temperature and to perform second warmup processing with an amount of heat generation greater than the first warmup processing when it is judged that the temperature of the fuel cell has fallen during the first warmup processing.

Constitution 2

The fuel cell system according to Constitution 1, wherein the warmup control part is configured to perform third warmup processing with an amount of heat generation greater than the second warmup processing when it is judged that the temperature of the fuel cell has fallen during the second warmup processing.

Constitution 3

A fuel cell system, comprising
a fuel cell,
sensors configured to detect a temperature of the fuel cell and an outside air temperature,
a calculation part configured to calculate a first threshold temperature and a second threshold temperature lower than the first threshold temperature, based on the outside air temperature, and
a warmup control part configured to perform first warmup processing when it is judged that the temperature of the fuel cell is lower than the first threshold temperature and higher than the second threshold temperature and to perform second warmup processing with an amount of heat generation greater than the first warmup processing when it is judged that the temperature of the fuel cell is lower than the second threshold temperature.

Constitution 4

The fuel cell system according to Constitution 3, wherein the calculation part is further configured to calculate a third threshold temperature lower than the second threshold temperature based on the outside air temperature, and
the warmup control part is further configured to perform the second warmup processing when it is judged that the temperature of the fuel cell is lower than the second threshold temperature and higher than the third threshold temperature and third warmup processing with an amount of heat generation greater than the second warmup processing when it is judged the temperature of the fuel cell is lower than the third threshold temperature.

Constitution 5

A fuel cell system, comprising
a fuel cell having a variable output voltage,
a boost converter configured to raise an output voltage of the fuel cell to a boost voltage, the boost converter having a variable boost voltage, and
a warmup control part configured to perform first warmup processing, in which the fuel cell is operated with the boost voltage of the boost converter being set to a lowered boost voltage lower than the base boost voltage and the output voltage of the fuel cell being set to a first output voltage lower than a base output voltage,
wherein the first output voltage is lower than an input lower limit of the boost converter when the boost voltage of the boost converter is the base boost voltage, and is higher than the input lower limit of the boost converter when the boost voltage of the boost converter is the lowered boost voltage.

Constitution 6

The fuel cell system according to Constitution 5, wherein the warmup control part is further configured to perform second warmup processing, in which the fuel cell is operated with the boost voltage of the boost converter being set to the base boost voltage and the output voltage of the fuel cell being set to a second output voltage lower than the base output voltage and higher than the first output voltage, and to switch from the second warmup processing to the first warmup processing, and the warmup control part is further configured to change the output voltage of the fuel cell and the boost voltage of the boost converter so that the output voltage of the fuel cell is maintained higher than the input lower limit of the boost converter when switching from the second warmup processing to the first warmup processing.

Constitution 7

The fuel cell system according to Constitution 6, further comprising a sensor configured to detect a temperature of the fuel cell, wherein the warmup control part is further configured to perform first warmup processing when it is judged that the temperature of the fuel cell has fallen during second warmup processing.

Constitution 8

The fuel cell system according to Constitution 6 or 7, wherein the warmup control part is further configured to perform third warmup processing, in which the fuel cell is operated with the boost voltage of the boost converter being set to the base boost voltage and the output voltage of the fuel cell being set to a third output voltage lower than the base output voltage and higher than the second output voltage, and to switch from the third warmup processing to the second warmup processing.

Constitution 9

The fuel cell system according to Constitution 8, further comprising a sensor configured to detect a temperature of the fuel cell, wherein the warmup control part is further configured to perform second warmup processing when it is judged that the temperature of the fuel cell has fallen during third warmup processing.

Constitution 10

A method of controlling a fuel cell system, comprising
detecting a temperature of the fuel cell by a sensor, and
performing first warmup processing when it is judged that the temperature of the fuel cell is lower than a predetermined threshold temperature, and performing second warmup processing with an amount of heat generation greater than the first warmup processing when it is judged that the temperature of the fuel cell has fallen during the first warmup processing.

Constitution 11

A method of controlling a fuel cell system, comprising
detecting a temperature of the fuel cell by a sensor,
calculating a first threshold temperature and a second threshold temperature lower than the first threshold temperature, based on the outside air temperature, and
performing first warmup processing when it is judged that the temperature of the fuel cell is lower than the first threshold temperature and higher than the second threshold temperature and to perform second warmup processing with an amount of heat generation greater than the first warmup processing when it is judged that the temperature of the fuel cell is lower than the second threshold temperature.

Constitution 12

A method of controlling a fuel cell system, the fuel cell system including
a fuel cell having a variable output voltage and
a boost converter configured to raise an output voltage of the fuel cell to a boost voltage, the boost converter having a variable boost voltage,
the method comprising
performing first warmup processing, in which the fuel cell is operated with the boost voltage of the boost converter being set to a lowered boost voltage lower than the base boost voltage and the output voltage of the fuel cell being set to a first output voltage lower than a base output voltage,
wherein the first output voltage is lower than an input lower limit of the boost converter when the boost voltage of the boost converter is the base boost voltage, and is higher than the input lower limit of the boost converter when the boost voltage of the boost converter is the lowered boost voltage.

Advantageous Effects of Invention

It is possible to end warmup processing reliably and early while reducing the energy consumption due to warmup processing.

DESCRIPTION OF EMBODIMENTS

Figure 1:
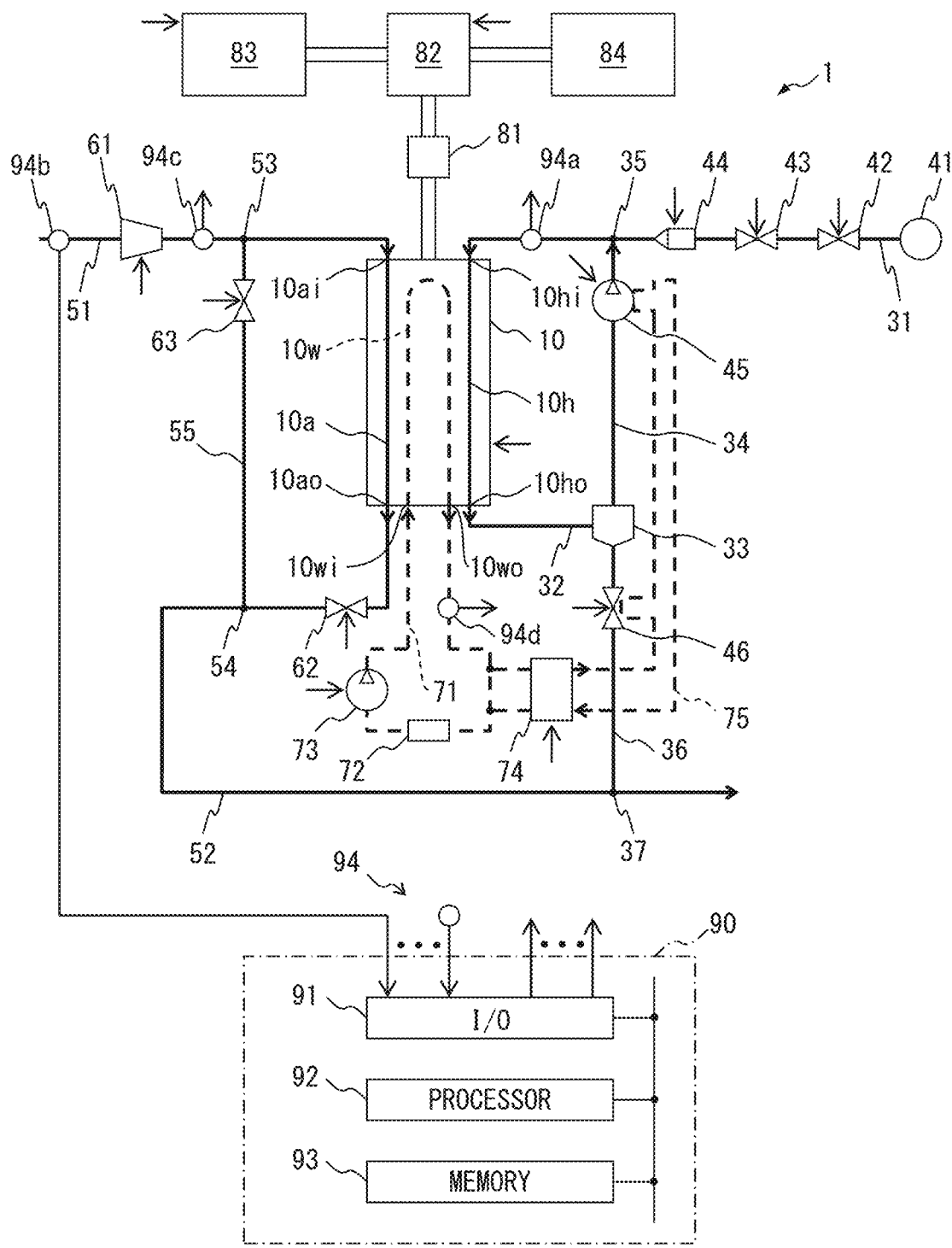
FIG. 1 is a schematic overall view of a fuel cell system of an embodiment according to the present disclosure.

Referring to FIG. 1, in an embodiment according to the present disclosure, a fuel cell system 1 is provided with a fuel cell 10. The fuel cell 10 is comprised of a plurality of unit cells stacked together. The fuel cell 10 is provided with a hydrogen passage 10$h$, air passage 10$a$, and cooling water passage 10$w$. In one example, the fuel cell system 1 is mounted in a vehicle.

In an embodiment according to the present disclosure, the hydrogen passage 10$h$ extends through the inside of the fuel cell 10 from an inlet 10$hi$ to an outlet 10$ho$. Inside the hydrogen passage 10$h$, an anode (not shown) is arranged. At the inlet 10$hi$, a hydrogen supply path 31 is connected. At the outlet 10$ho$, a hydrogen exhaust path 32 is connected. An outlet of the hydrogen exhaust path 32 is connected to an inlet of a gas-liquid separator 33. An upper outlet of the gas-liquid separator 33 is connected through a return passage 34 to a merging point 35 of the hydrogen supply path 31. A lower outlet of the gas-liquid separator 33 is connected through a drain passage 36 to a merging point 37 of an air exhaust path 52 (explained later).

In an embodiment according to the present disclosure, an inlet of the hydrogen supply path 31 is connected to a hydrogen tank 41. Further, inside the hydrogen supply path 31, in order from the upstream side, a solenoid type main stop valve 42, solenoid type regulator 43, and solenoid type injector 44 are provided. The above-mentioned merging point 35 is positioned at the hydrogen supply path 31 downstream of the injector 44. Further, inside the return passage 34, a return pump 45 is provided for returning hydrogen to the hydrogen supply path 31. Further, inside the drain passage 36, a solenoid type drain control valve 37 is arranged.

Further, in an embodiment according to the present disclosure, the air passage 10$a$ extends through the inside of the fuel cell 10 from the inlet 10$ai$ to the outlet 10$ao$. Inside the air passage 10$a$, a cathode (not shown) is arranged. At the inlet 10$ai$, an air supply path 51 is connected. At the outlet 10$ao$, an air exhaust path 52 is connected. The diverging point 53 of the air supply path 51 and the merging point 54 of the air exhaust path 52 are connected with each other by a bypass passage 55 bypassing the fuel cell 10.

In an embodiment according to the present disclosure, the inlet of the air passage 10$a$ is communicated with the atmosphere. Further, inside the air supply path 51, a compressor 61 is arranged. The above-mentioned diverging point 53 is positioned at the air supply path 51 downstream of the compressor 61. Further, inside the air exhaust path 52, a solenoid type pressure regulating valve 62 is provided. Further, inside the bypass passage 55, a solenoid type bypass control valve 63 is provided.

If the main stop valve 42, regulator 43, and injector 44 are opened, hydrogen is supplied to the fuel cell 10. On the other hand, if the compressor 61 is actuated, air or oxygen is supplied to the fuel cell 10. As a result, in the fuel cell 10, an electrochemical reaction ($H_2 \rightarrow 2H^+ + 2e^-$, $(1/2)O_2 + 2H^+ + 2e^- \rightarrow H_2O$) occurs and electric power is generated.

Anode off gas exhausted at this time from the hydrogen passage 10$h$ is sent through the hydrogen exhaust path 32 to the gas-liquid separator 33. In the anode off gas, unreacted hydrogen, water generated inside the fuel cell 10, nitrogen and oxygen from the air passage 10$a$ passing through the electrolytic membrane, etc. are included. At the gas-liquid separator 33, the anode off gas is separated into a gas component and liquid component. The gas component of the anode off gas is returned by the return pump 45 through the return passage 34 to the hydrogen supply path 31. On the other hand, the cathode off gas exhausted from the air passage 10$a$ is discharged through the air exhaust path 52 to the atmosphere.

On the other hand, in an embodiment according to the present disclosure, the drain control valve 46 is usually closed. If the drain control valve 46 is opened, the liquid component of the anode off gas is exhausted through the drain passage 36 to the air exhaust path 52.

Further, referring to FIG. 1, in an embodiment according to the present disclosure, the cooling water passage 10$w$ extends through the inside of the fuel cell 10 from the inlet 10$wi$ to the outlet 10$wo$. The inlet 10$wi$ and the outlet 10$wo$ are connected with each other outside of the fuel cell 10 by a cooling water circulation passage 71. Inside of the cooling water circulation passage 71, in order from the upstream side, a radiator 72 and cooling water pump 73 are provided. Therefore, if high temperature cooling water flows through the cooling water passage 10$w$, the fuel cell 10 is heated.

Further, in an embodiment according to the present disclosure, at the cooling water circulation path 71, another cooling water circulation path 75 is connected through an air-conditioner heater circuit 74. As a result, cooling water can flow through the air-conditioner heater circuit 74 between the cooling water circulation path 71 and another cooling water circulation path 75. At the air-conditioner heater circuit 74, for example, another cooling water pump (not shown), a heater core (not shown) for heating the air for the air-conditioner (not shown), an electric heater (not shown) for heating the cooling water flowing through the air-conditioner heater circuit 74, a control valve (not shown) controlling the amount of cooling water flowing between the cooling water circulation path 71 and the air-conditioner heater circuit 74, etc. are included. Further, at the other cooling water circulation path 75, for example, a cooling water passage of the drain control valve 46, a cooling water passage of the return pump 45, etc. are included. Therefore, if high temperature cooling water flows through the other cooling water circulation path 75, the return pump 45 and drain control valve 46 are heated.

Further, if referring to FIG. 1, in an embodiment according to the present disclosure, the fuel cell 10 is electrically connected through a boost converter 81 to a power control unit 82. The power control unit 82 is electrically connected to, for example, a motor-generator 83 and battery 84. The electric power generated at the fuel cell 10 is sent by the power control unit 82 to the motor-generator 83 operating as an electric motor to be used for generating vehicle drive power, or is sent to the battery 84 and stored therein. At this time, the output voltage of the fuel cell 10 is raised by the boost converter 81 to a boost voltage. In an embodiment according to the present disclosure, the boost voltage of the boost converter 81 can be changed by the power control unit 82. At the time of normal operation, the boost voltage is maintained at the base boost voltage VBB. Note that, when the motor-generator 83 is operated as a generator by regenerative operation, the electric power generated at the motor-generator 83 is sent through the power control unit 82 to the battery 84.

The fuel cell system 1 of an embodiment according to the present disclosure is provided with an electronic control unit 90. The electronic control unit 90 for example includes components communicatively connected by a bidirectional bus with each other such as an input-output port 91, one or more processors 92, and one or more memories 93. A processor 92 includes a microprocessor (CPU) etc. A memory 93 for example includes a ROM (read only memory), RAM (random access memory), etc. In the memory 93, various programs are stored. These programs are run at the processor 92 whereby various routines are executed.

At the input-output port 91, one or more sensors 94 are connected communicatively. The sensors 94 include, for example, a pressure sensor 94a provided in the hydrogen supply path 31 between the merging point 35 and fuel cell 10 for detecting the pressure inside the hydrogen passage 10h, an air flow meter 94b provided in the air supply path 51 upstream of the compressor 61 for detecting the quantity of air flowing through the air supply path 51, a pressure sensor 94c provided in the air supply path 51 between the compressor 61 and diverging point 53 for detecting the pressure inside the air passage 10a, a water temperature sensor 94d provided in the cooling water circulation path 71 for detecting the temperature of the cooling water flowing out from the cooling water passage 10w, etc. The temperature of the cooling water flowing out from the cooling water passage 10w expresses the temperature of the fuel cell 10 or the fuel cell system 1. On the other hand, the input/output port 91 is communicatively connected to the fuel cell 10, main stop valve 42, regulator 43, injector 44, return pump 45, drain control valve 46, compressor 61, pressure regulating valve 62, bypass control valve 63, cooling water pump 73, air-conditioner heater circuit 74, power control unit 82, motor-generator 83, etc. These fuel cell 10 etc. are controlled based on signals from the electronic control unit 90.

In this regard, if the water present, for example, inside of the hydrogen passage 10h or the air passage 10a of the fuel cell 10 freezes, the hydrogen passage 10h or the air passage 10a may be clogged. Further, if the water attached to the pump or valves etc. freezes, the pump or valves etc. may not accurately operate. Therefore, in the fuel cell system 1 of an embodiment according to the present disclosure, in order to prevent freezing, warmup control is performed to heat the fuel cell system 1 or the fuel cell 10. Next, a first embodiment of warmup control according to the present disclosure will be explained.

Figure 2:
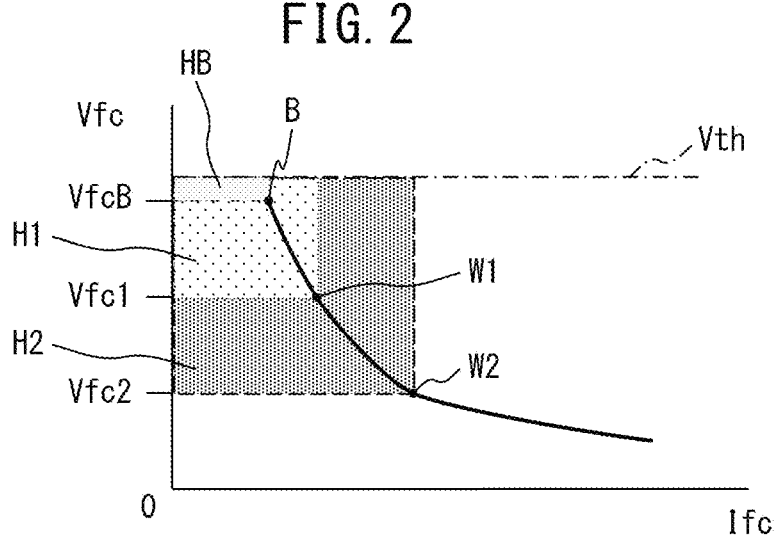
FIG. 2 is an operational diagram for explaining a first embodiment of warmup control according to the present disclosure.

In the first embodiment of warmup control according to the present disclosure, first warmup processing and second warmup processing are performed. FIG. 2 shows one example of an operating point W1 of the first warmup processing and an operating point W2 of the second warmup processing in an operating region determined by the output voltage Vfc and output current Ifc of the fuel cell 10. In FIG. 2, the solid line shows the equipower line of the fuel cell 10, while Vth shows the theoretical electromotive voltage of the fuel cell 10. Further, in FIG. 2, B shows one example of an operating point at the time of normal operation where warmup processing is not performed. The amount of heat generation of the fuel cell 10 at the time of normal operation is expressed by the area of the square shown by HB. Further, FIG. 2 shows the output voltage of the fuel cell 10 at the time of normal operation as a base output voltage VfcB.

Referring to FIG. 2, when the first warmup processing (W1) should be performed, while the output of the fuel cell 10 is maintained, the output voltage Vfc of the fuel cell 10 is set to a first output voltage Vfc1 which is lower than the base output voltage VfcB. In other words, the power generation efficiency of the fuel cell 10 is lowered. The amount of heat generation of the fuel cell 10 in this case is expressed by the area of the square shown by H1 in FIG. 2. As a result, compared with the time of normal operation (HB), the amount of heat generation of the fuel cell 10 is increased. Due to this, the fuel cell 10 itself is heated. Further, the cooling water flowing through the cooling water passage 10w in the fuel cell 10 is heated. Flowing of this cooling water through the cooling water circulation path 71 and another cooling water circulation path 75 will heat the fuel cell 10, return pump 45, drain control valve 46, etc. Therefore, the fuel cell system 1 is warmed up and the occurrence of freezing in the fuel cell system 1 is limited.

On the other hand, when the second warmup processing (W2) should be performed, while the output of the fuel cell 10 is maintained, the output voltage Vfc of the fuel cell 10 is set to a second output voltage Vfc2 which is lower than the first output voltage Vfc1. The amount of heat generation of the fuel cell 10 in this case is expressed by the area of the square shown by H2 in FIG. 2. As a result, compared with the time of the first warmup processing (H1), the amount of heat generation of the fuel cell 10 is increased.

Figure 3:
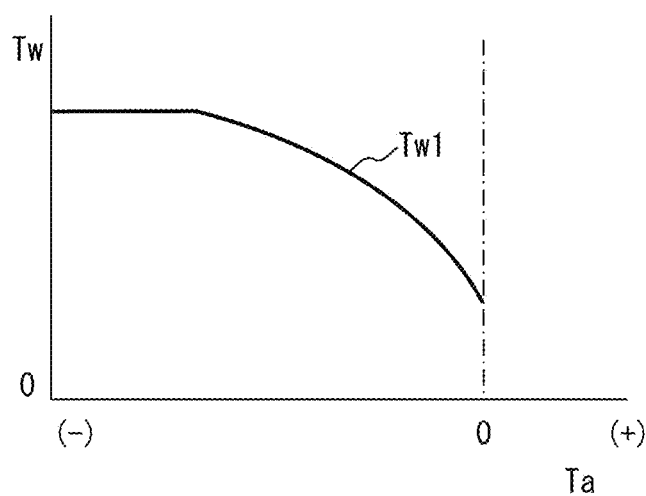
FIG. 3 is a graph showing a first threshold temperature Tw1 of the first embodiment of warmup control according to the present disclosure.

In the first embodiment of warmup control according to the present disclosure, the first warmup processing is performed when the cooling water temperature Tw is lower than a first threshold temperature Tw1, and is not performed when the cooling water temperature Tw is higher than the first threshold temperature Tw1. This first threshold temperature Tw1 is determined based on the outside air temperature Ta. Specifically, as shown in FIG. 3, when the outside air temperature Ta is high, the first threshold temperature Tw1 is lower compared with when the outside air temperature Ta is low. As a result, even if the cooling water temperature Tw is low, if the outside air temperature Ta is high, the first warmup processing is not performed. Conversely, even if the cooling water temperature Tw is high, if the outside air temperature Ta is low, the first warmup processing is performed. In other words, when the need for warmup processing is low, the first warmup processing is not performed, while when the need for warmup processing is high, the first warmup processing is performed. Therefore, while the energy consumption by the warmup processing is reduced, freezing of the fuel cell system 1 is reliably limited.

Figure 4:
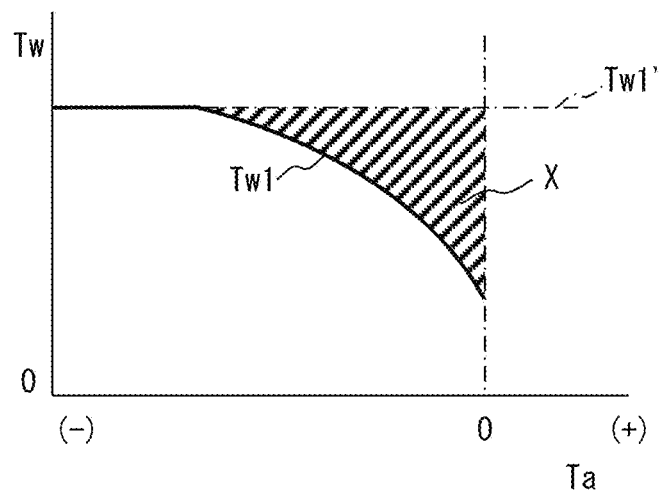
FIG. 4 is a graph for explaining the first embodiment of warmup control according to the present disclosure.

That is, compared with a conventional example in which warmup processing is performed when the cooling water temperature Tw is lower than a constant value Tw1', in the first embodiment of warmup control according to the present disclosure, warmup processing is not performed in the region shown by X in FIG. 4. Therefore, the energy consumption by the warmup processing is reduced by that amount.

Note that, in the first embodiment of warmup control according to the present disclosure, when the outside air temperature Ta is equal to or higher than zero degree Celsius, warmup processing is not performed regardless of the cooling water temperature Tw. On this point, it may be considered that the first threshold temperature Tw1 when the outside air temperature Ta is equal to or higher than zero degree Celsius be set for example to infinitely small. Note that, the first threshold temperature Tw1 is stored as a function of the outside air temperature Ta in advance in the memory 93.

In the first embodiment of warmup control according to the present disclosure, if it is judged that the cooling water temperature Tw has reached the target temperature Twt due to the first warmup processing, the first warmup processing is ended. In this regard, however, for example, when the vehicle is running on a downhill road, the running air may increase the amount of heat removed from the fuel cell 10, and the cooling water temperature Tw may fall even during the first warmup processing.

Therefore, in the first embodiment of warmup control according to the present disclosure, if it is judged that the cooling water temperature Tw fell during the first warmup processing, the second warmup processing is performed. As a result, the amount of heat generation due to the warmup processing is increased and therefore warmup processing is reliably and quickly ended.

Figure 5:
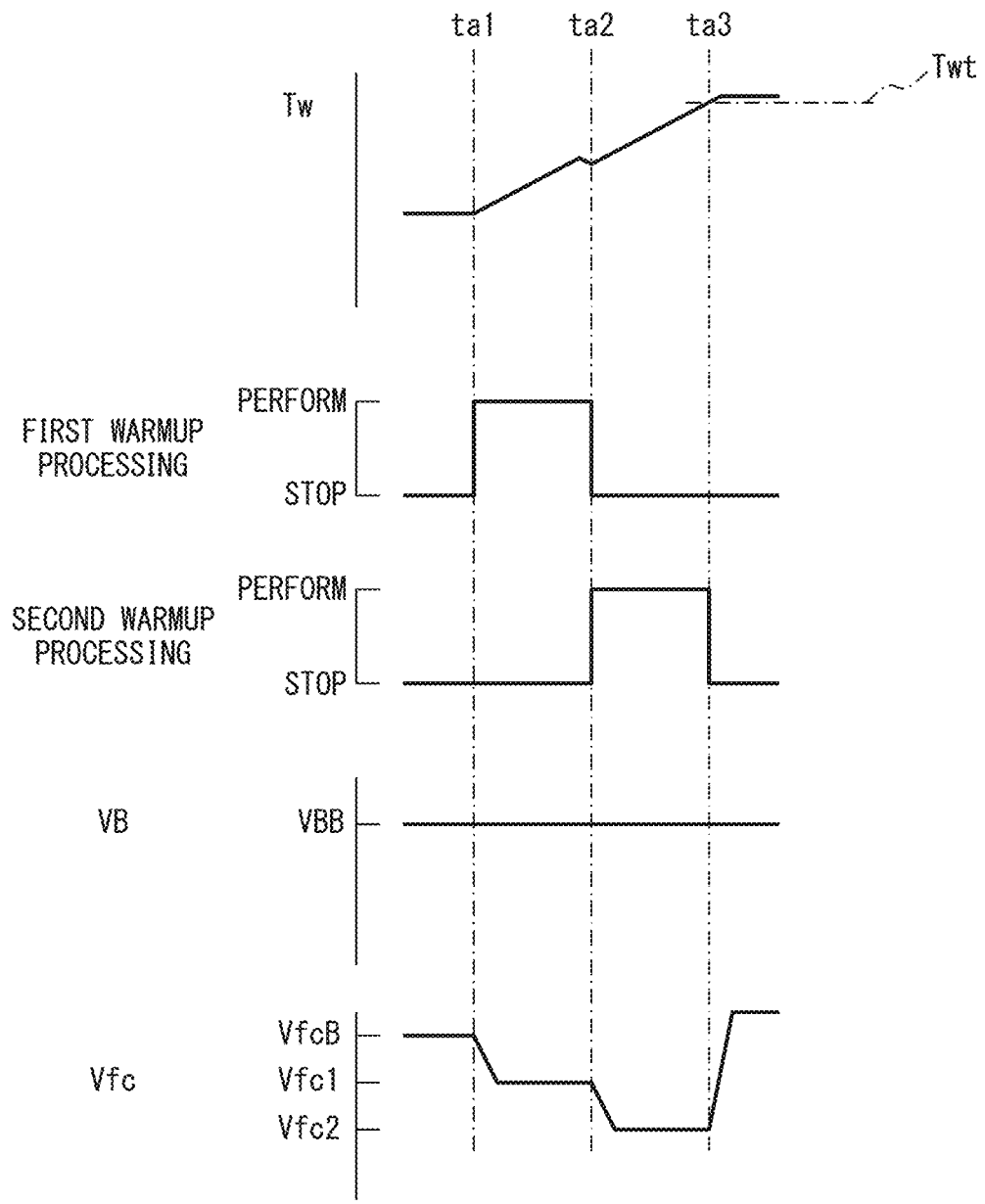
FIG. 5 is a time chart for explaining the first embodiment of warmup control according to the present disclosure.

That is, in the first embodiment of the warmup control according to the present disclosure, as shown in FIG. 5, at the time ta1, the first warmup processing is started. That is, the output voltage Vfc of the fuel cell 10 is lowered from the base output voltage VfcB to the first output voltage Vfc1. At the next time ta2, if it is judged that the cooling water temperature Tw has fallen, the first warmup processing is stopped and the second warmup processing is performed. That is, the output voltage Vfc of the fuel cell 10 is lowered from the first output voltage Vfc1 to the second output voltage Vfc2. At the next time ta3, if it is judged that the cooling water temperature Tw has reached the target temperature Twt, the second warmup processing is stopped. That is, the output voltage Vfc of the fuel cell 10 is returned to the base output voltage VfcB. Note that, in the first embodiment of warmup control according to the present disclosure, at the time of the first warmup processing and at the time of the second warmup processing, the boost voltage VB of the boost converter 81 is maintained at the base boost voltage VBB.

In the first embodiment of warmup control according to the present disclosure, at the time of the first warmup processing and at the time of the second warmup processing, the cooling water is heated by an electric heater (not shown) as well. Therefore, the warmup processing is made to be completed further faster.

Figure 6:
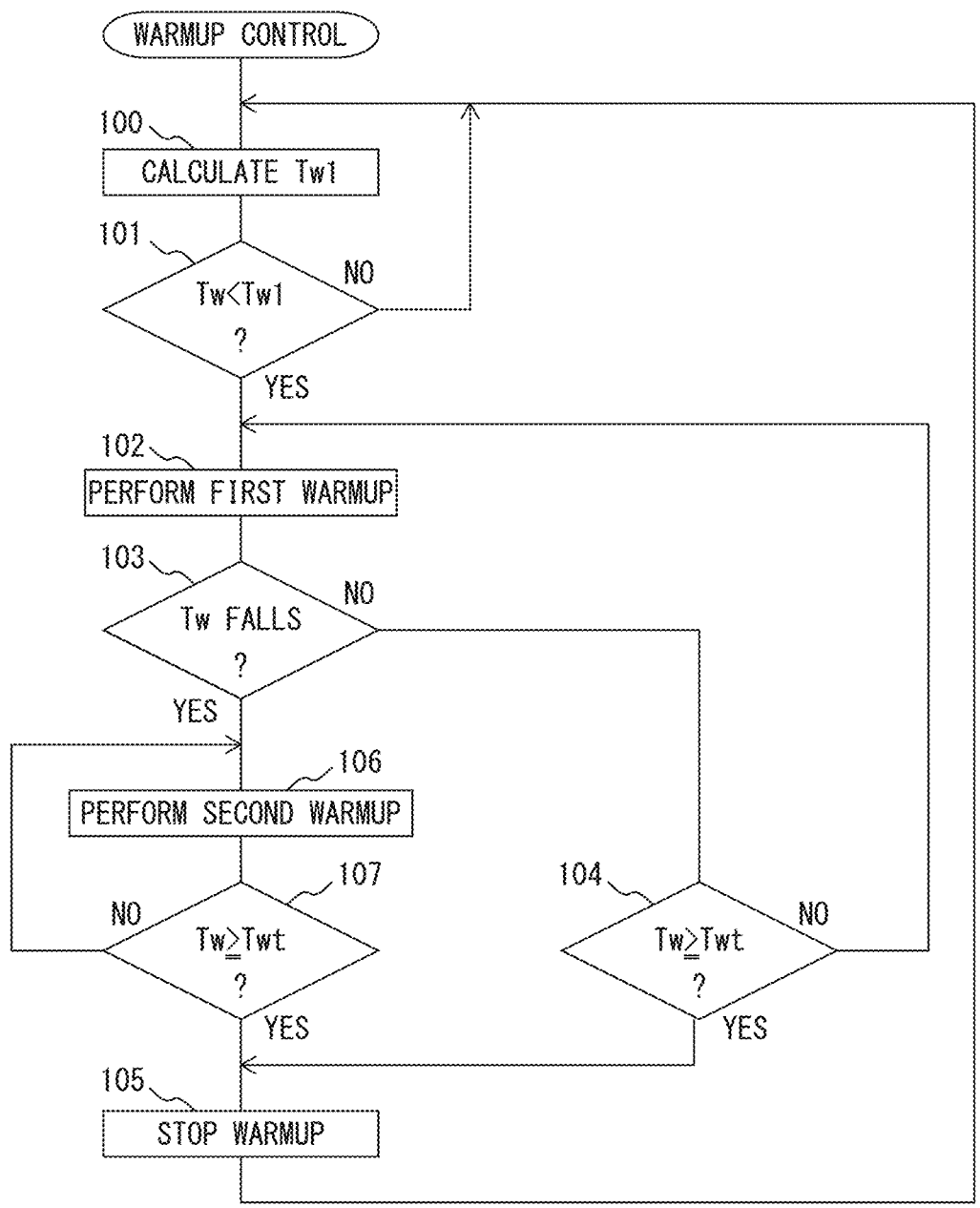
FIG. 6 is a flow chart showing a routine for performing the first embodiment of warmup control according to the present disclosure.

FIG. 6 shows a routine for performing a first embodiment of warmup processing according to the present disclosure. Referring to FIG. 6, at step 100, the first threshold temperature Tw1 is calculated. At the next step 101, it is judged if the cooling water temperature Tw is lower than the first threshold temperature Tw1. When Tw≥Tw1, the routine returns to step 100. At this time, warmup processing is not performed. When Tw<Tw1, the routine proceeds to step 102 where the first warmup processing is performed. At the next step 103, it is judged if the cooling water temperature Tw has fallen. When the cooling water temperature Tw has not fallen, next the routine proceeds to step 104 where it is judged if the cooling water temperature Tw is equal to or higher than the target temperature Twt. When Tw<Twt, the routine returns to step 102. When Tw≥Twt, next the routine proceeds to step 105 where the first warmup processing is stopped. Next, the routine is returned to step 100.

As opposed to this, when the cooling water temperature Tw falls, the routine proceeds from step 103 to step 106 where the second warmup processing is performed. At the next step 107, it is judged if the cooling water temperature Tw is equal to or higher than the target temperature Twt. When Tw<Twt, the routine returns to step 106. When Tw≥Twt, next the routine proceeds to step 105 where the second warmup processing is stopped.

Figure 7:
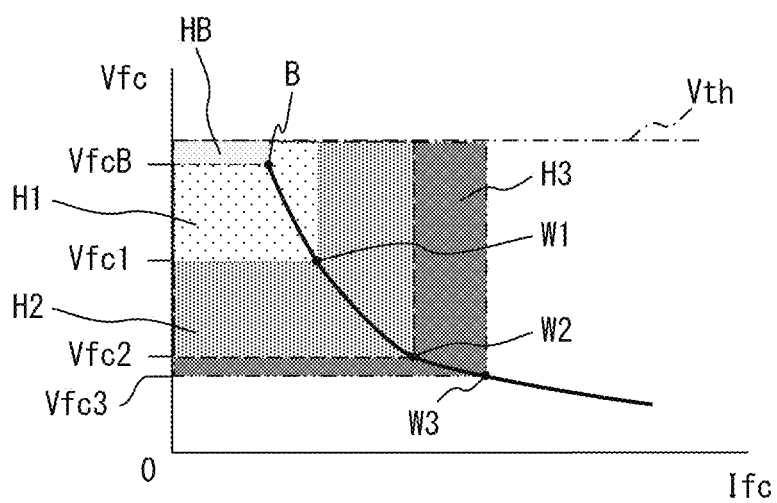
FIG. 7 is an operational diagram, similar to FIG. 2, for explaining a second embodiment of warmup control according to the present disclosure.

Next, a second embodiment of warmup control according to the present disclosure will be explained. If explaining the points of difference with the first embodiment of warmup control according to the present disclosure, in the second embodiment of warmup control according to the present disclosure, third warmup processing is performed in addition to the first warmup processing and the second warmup processing. FIG. 7 shows one example of the operating point W1 of the first warmup processing, the operating point W2 of the second warmup processing, and the operating point W3 of the third warmup processing.

Referring to FIG. 7, when the third warmup processing (W3) should be performed, the output voltage Vfc of the fuel cell 10 is set to a third output voltage Vfc3 lower than the second output voltage Vfc2 while the output of the fuel cell 10 is maintained. The amount of heat generation of the fuel cell 10 in this case is expressed by the area of the square shown by H3 in FIG. 7. As a result, compared with the time of the second warmup processing (H2), the amount of heat generation of the fuel cell 10 is increased.

In the second embodiment of warmup control according to the present disclosure, if it is judged that the cooling water temperature Tw has fallen during the second warmup processing, the third warmup processing is performed. As a result, warmup processing is ended further reliably and further quickly.

Figure 8:
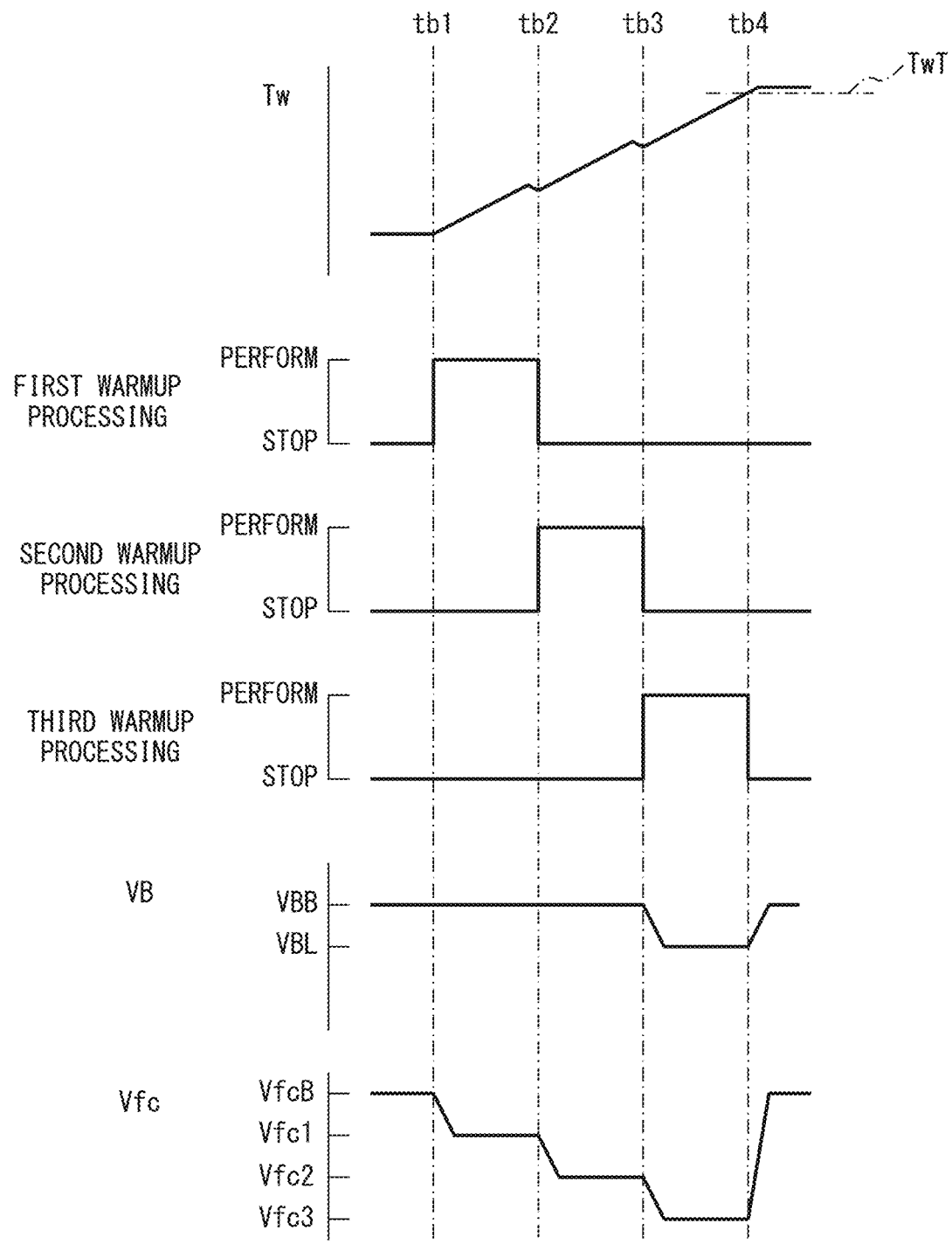
FIG. 8 is a time chart for explaining the second embodiment of warmup control according to the present disclosure.

That is, in the second embodiment of warmup control according to the present disclosure, as shown in FIG. 8, at the time tb1, the first warmup processing is started. That is, the output voltage Vfc of the fuel cell 10 is lowered from the base output voltage VfcB to the first output voltage Vfc1. At the next time tb2, if it is judged that the cooling water temperature Tw has fallen, the first warmup processing is stopped and the second warmup processing is performed. That is, the output voltage Vfc of the fuel cell 10 is lowered from the first output voltage Vfc1 to the second output voltage Vfc2. At the next time tb3, if it is judged that the cooling water temperature Tw has fallen, the second warmup processing is stopped and the third warmup processing is performed. That is, the output voltage Vfc of the fuel cell 10 is lowered from the second output voltage Vfc2 to the third output voltage Vfc3. At the next time tb4, if it is judged that the cooling water temperature Tw has reached the target temperature Twt, the third warmup processing is stopped. That is, the output voltage Vfc of the fuel cell 10 is returned to the base output voltage VfcB.

Further, in the second embodiment of warmup control according to the present disclosure, if the third warmup processing is performed, the boost voltage VB of the boost converter 81 is lowered from the base boost voltage VBB to the lowered boost voltage VBL (<VBB), while if the third warmup processing is ended, the boost voltage is returned to the base boost voltage VBB. This is done for the following reason.

As explained above, the boost converter 81 of an embodiment according to the present disclosure raises the input voltage Vin, which is the output voltage Vfc of the fuel cell 10, to the boost voltage VB. In this case, if referring to the ratio of the boost voltage VB to the input voltage Vin as a boost ratio "r" (=VB/Vin), there is an upper limit rUL to the boost ratio "r". Therefore, to raise the input voltage Vin to the boost voltage VB, the input voltage Vin must be equal to or higher than VB/rUL. If referring to this VB/rUL as an input lower limit of the boost converter 81, the input lower limit depends on the boost voltage VB. If the boost voltage VB becomes lower, the input lower limit also becomes lower.

On the other hand, in order to increase the amount of heat generation of the fuel cell 10 at the time of warmup processing more, it is necessary to lower the output voltage Vfc of the fuel cell 10 more. In this regard, however, when the boost voltage VB of the boost converter 81 is the base boost voltage VBB, the output voltage Vfc of the fuel cell 10 cannot be made lower than the input lower limit VinLL at the time of the base boost voltage VBB.

Therefore, in the second embodiment of warmup control according to the present disclosure, at the time of the third warmup processing, the boost voltage VB of the boost converter 81 is lowered from the base boost voltage VBB to the lowered boost voltage VBL. As a result, the input lower limit VinLL of the boost converter 81 is lowered, and thus the output voltage Vfc of the fuel cell 10 can be further lowered.

Figure 9:
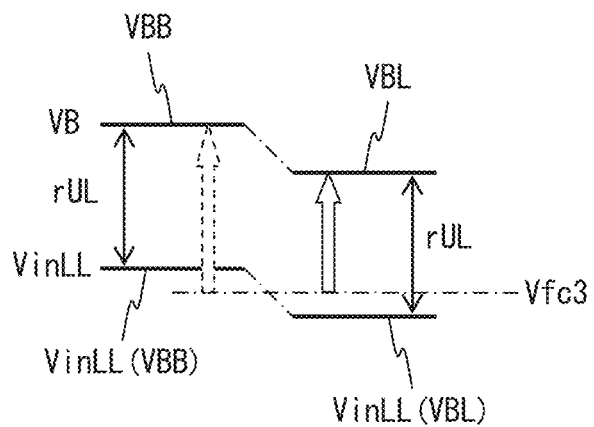
FIG. 9 is a graph for explaining a boost voltage and input lower limit of a boost converter.

That is, as shown in FIG. 9, the third output voltage Vfc of the second embodiment of warmup control according to the present disclosure is lower than the input lower limit VinLL (VBB) when the boost voltage VB is the base boost voltage VBB. Therefore, it is not possible to lower the output voltage Vfc of the fuel cell 10 to the third output voltage Vfc3 while maintaining the boost voltage VB at the base boost voltage VBB. As opposed to this, if the boost voltage VB is lowered to the lowered boost voltage VBL, the third output voltage Vfc becomes higher than the input lower limit VinLL (VBL) when the boost voltage VB is the lowered boost voltage VBL. Therefore, the output voltage Vfc of the fuel cell 10 can be lowered to the third output voltage Vfc3. Therefore, the amount of heat generation of the fuel cell 10 due to warmup processing is further increased.

From another viewpoint, in the second embodiment of warmup control according to the present disclosure, the third output voltage Vfc3 is lower than the input lower limit VinLL (VBB) when the boost voltage VB is the base boost voltage VBB and is higher than the input lower limit VinLL (VBL) when the boost voltage VB is the lowered boost voltage VBL. As opposed to this, the first output voltage Vfc1 and the second output voltage Vfc2 are higher than the input lower limit VinLL (VBB) when the boost voltage VB is the base boost voltage VBB.

If the boost voltage VB is lowered to the lowered boost voltage VBL, the voltage supplied from the boost converter 81 through the power control unit 82 to the motor-generator 83 etc. also falls. In the second embodiment of warmup control according to the present disclosure, the lowered boost voltage VBL is set so that even if the boost voltage VB is lowered to the lowered boost voltage VBL, good operation of the motor-generator 83 etc. is secured.

As can be understood from the above explanation, when the third warmup processing should be performed, the boost voltage VB is lowered from the base boost voltage VBB to the lowered boost voltage VBL and the output voltage Vfc of the fuel cell 10 is lowered from the second output voltage Vfc2 to the third output voltage Vfc3. In this case, in the second embodiment of warmup control according to the present disclosure, the boost voltage VB and the output voltage Vfc of the fuel cell 10 are changed so that the output voltage Vfc of the fuel cell 10 is maintained higher than the input lower limit VinLL of the boost converter 81.

Figure 10:
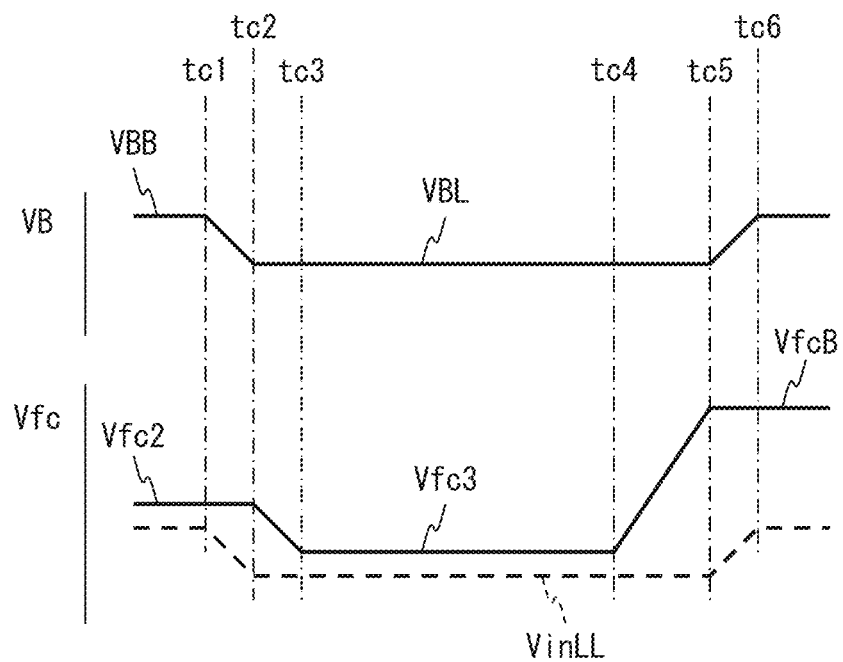
FIG. 10 is a time chart showing a boost voltage and output voltage of a fuel cell in the second embodiment of warmup control according to the present disclosure.

That is, as shown in FIG. 10, if it is judged that the second warmup processing is switched to the third warmup processing, at the time tc1, the boost voltage VB is lowered from the base boost voltage VBB while the output voltage Vfc of the fuel cell 10 is maintained at the second output voltage Vfc2. At the next time tc2, if it is judged that the boost voltage VB has reached the lowered boost voltage VBL, the output voltage Vfc of the fuel cell 10 is lowered from the second output voltage Vfc2. At the next time tc3, the output voltage Vfc of the fuel cell 10 reaches the third output voltage Vfc. Next, if it is judged that the third warmup processing should be stopped, at the time tc4, the output voltage Vfc of the fuel cell 10 is raised while the boost voltage VB is maintained at the lowered boost voltage VBL. At the next time tc5, if it is judged that the voltage has returned to the base output voltage VfcB, the boost voltage VB is raised. At the next time tc6, the boost voltage VB is returned to the base boost voltage VBB. In the second embodiment of warmup control according to the present disclosure, in this way, the output voltage Vfc of the fuel cell 10 is maintained higher than the input lower limit VinLL of the boost converter 81. On this point, for example, if lowering the output voltage Vfc of the fuel cell 10 while maintaining the boost voltage VB and then lowering the boost voltage VB, the output voltage Vfc of the fuel cell 10 may be lower than the input lower limit VinLL of the boost converter 81. This is not preferable.

Figure 11:
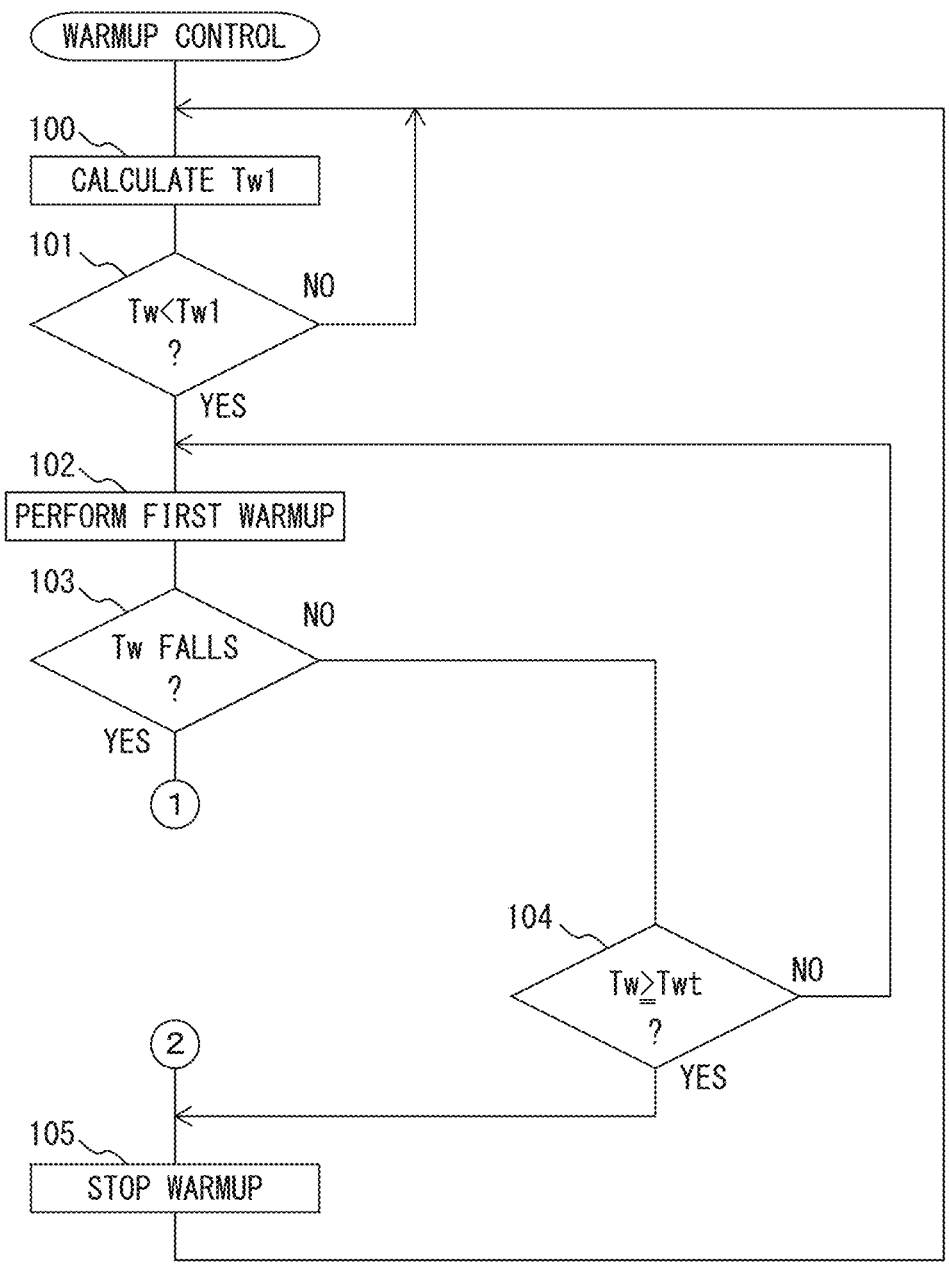
FIG. 11 is a flow chart showing a routine for performing the second embodiment of warmup control according to the present disclosure.
Figure 12:
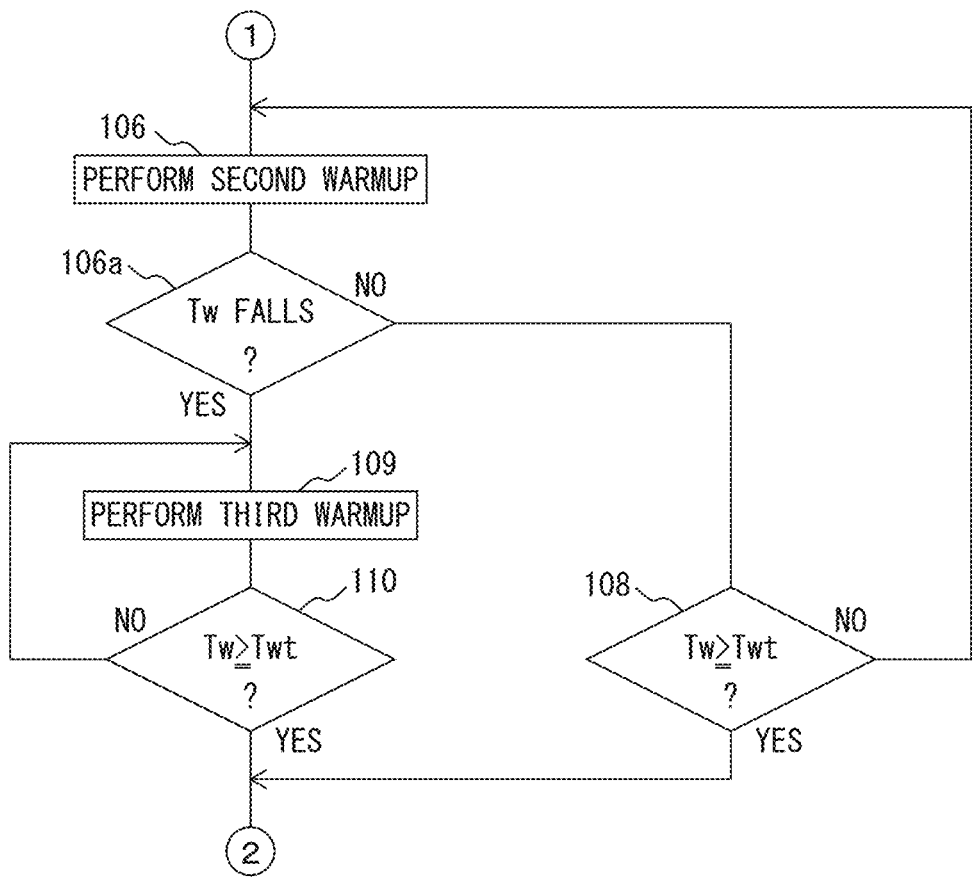
FIG. 12 is a flow chart showing a routine for performing the second embodiment of warmup control according to the present disclosure.

FIG. 11 and FIG. 12 show a routine for performing the second embodiment of the warmup processing according to the present disclosure. If explaining the points of difference from the routine shown in FIG. 6, in the routine shown in FIG. 11 and FIG. 12, after step 106 performing the second warmup processing, the routine proceeds to step 106a where it is judged if the cooling water temperature Tw has fallen. When the cooling water temperature Tw has not fallen, next the routine proceeds to step 108 where it is judged if the cooling water temperature Tw is equal to or higher than the target temperature Twt. When Tw<Twt, the routine returns to step 106. When Tw≥Twt, next the routine proceeds to step 105 where the second warmup processing is stopped. As opposed to this, when the cooling water temperature Tw has fallen, the routine proceeds from step 106a to step 109 where the third warmup processing is performed. At the next step 110, it is judged if the cooling water temperature Tw is equal to or higher than the target temperature Twt. When Tw<Twt, the routine returns to step 109. When Tw≥Twt, next the routine proceeds to step 105 where the third warmup processing is stopped.

Figure 13:
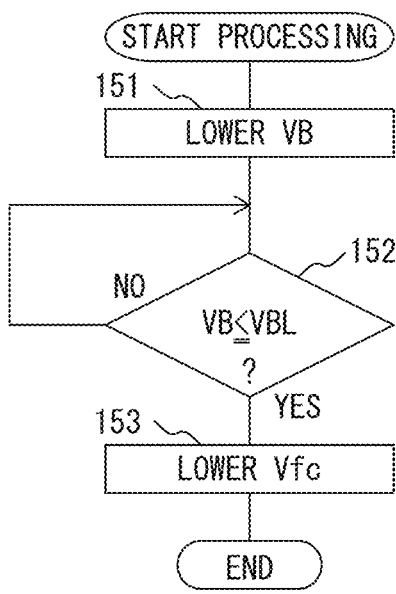
FIG. 13 is a flow chart showing a start processing routine.

FIG. 13 shows a start processing routine performed when starting the third warmup processing in the second embodiment of warmup control according to the present disclosure. This routine is for example performed at step 109 of FIG. 12. Referring to FIG. 13, at step 151, the boost voltage VB of the boost converter 81 is lowered toward the lowered boost voltage VBL while the output voltage Vfc of the fuel cell 10 is maintained. At the next step 152, it is judged if the boost voltage VB has become equal to or lower than the lowered boost voltage VBL. When VB>VBL, the routine returns to step 152. When VB≤VBL, next the routine proceeds to step 153 where the output voltage Vfc of the fuel cell 10 is lowered to the third output voltage Vfc3.

Figure 14:
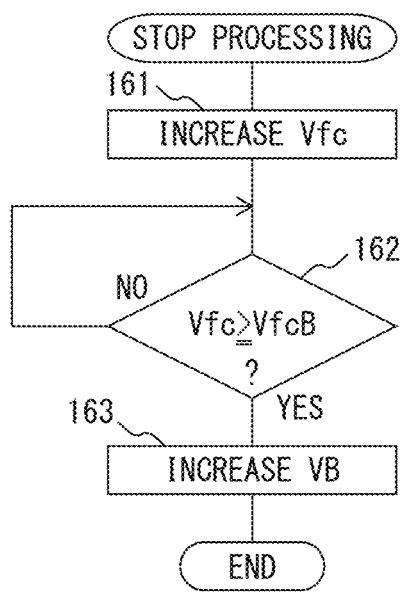
FIG. 14 is a flow chart showing a stop processing routine.

FIG. 14 shows a stop processing routine performed when stopping the third warmup processing in the second embodiment of warmup control according to the present disclosure. This routine is for example performed at step 105 of FIG. 11 after proceeding from step 110 of FIG. 12. Referring to FIG. 14, at step 161, the boost voltage VB of the boost converter 81 is maintained while the output voltage Vfc of the fuel cell 10 is raised toward the base output voltage VfcB. At the next step 161, it is judged if the output voltage Vfc of the fuel cell 10 has become equal to or higher than the base output voltage VfcB. When Vfc<VfcB, the routine returns to step 162. When Vfc≥VfcB, next the routine proceeds to step 163 where the boost voltage VB of the boost converter 81 is raised to the base boost voltage VBB.

In another embodiment (not shown), in the second embodiment of warmup control according to the present disclosure, for example, the second warmup processing is omitted. In this case, the first warmup processing is switched to the third warmup processing.

Figure 15:
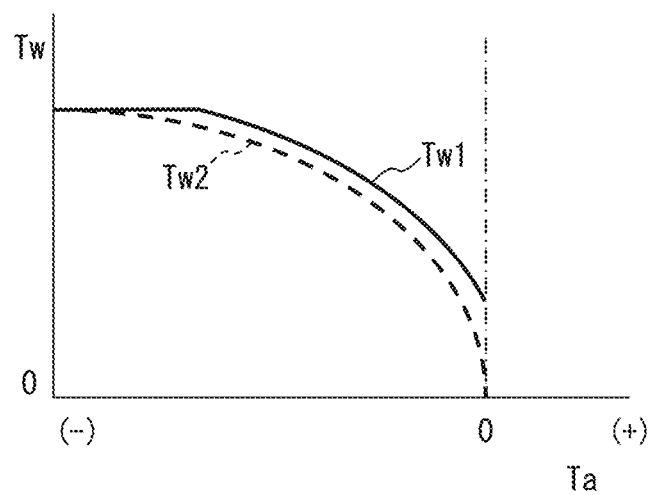
FIG. 15 is a graph for explaining a third embodiment of warmup control according to the present disclosure.

Next, a third embodiment of warmup control according to the present disclosure will be explained. If explaining the points of difference from the first embodiment of warmup control according to the present disclosure, in the third embodiment of warmup control according to the present disclosure, in addition to the first threshold temperature Tw1, a second threshold temperature Tw2 lower than the first threshold temperature Tw1 is calculated. This second threshold temperature Tw2 is also determined based on the outside air temperature Ta. Specifically, as shown in FIG. 15, when the outside air temperature Ta is high, the second threshold temperature Tw2 is lower compared to when the outside air temperature Ta is low. Note that, the second threshold temperature Tw2 is stored as a function of the outside air temperature Ta in advance in the memory 93.

In the third embodiment of warmup control according to the present disclosure, when the cooling water temperature Tw is lower than the second threshold temperature Tw2, the second warmup processing is performed. Further, when the cooling water temperature Tw is higher than the second threshold temperature Tw2 and lower than the first threshold temperature Tw1, the first warmup processing is performed. Further, when the cooling water temperature Tw is higher than the first threshold temperature Tw1, warmup processing is not performed.

As a result, when the cooling water temperature Tw is low, not the first warmup processing with the smaller amount of heat generation, but the second warmup processing with the larger amount of heat generation is performed. Further, when the cooling water temperature Tw is high, not the second warmup processing with the larger amount of heat generation, but the first warmup processing with the smaller amount of heat generation is performed. Further, when the cooling water temperature Tw is further higher, the warmup processing is not performed. Furthermore, even when the cooling water temperature Tw is low, if the outside air temperature Ta is high, the first warmup processing or the second warmup processing is not performed. Conversely, even if the cooling water temperature Tw is high, if the outside air temperature Ta is relatively low, the first warmup processing or the second warmup processing is performed. Therefore, the energy consumption due to warmup processing is further reduced while freezing of the fuel cell system 1 is reliably limited.

Figure 16:
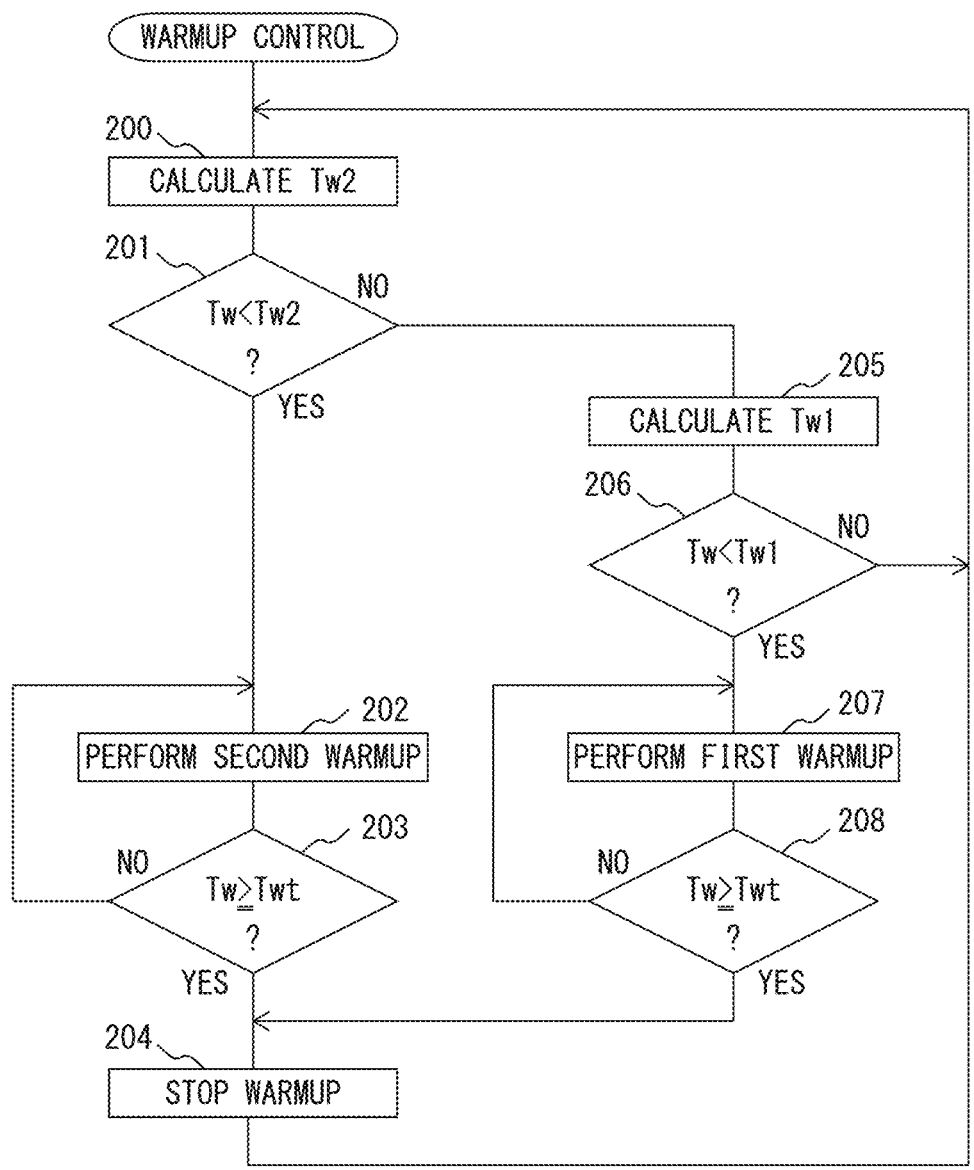
FIG. 16 is a flow chart showing a routine for performing the third embodiment of warmup control according to the present disclosure.

FIG. 16 shows a routine for performing the third embodiment of warmup processing according to the present disclosure. Referring to FIG. 16, at step 200, the second threshold temperature Tw2 is calculated. At the next step 201, it is judged if the cooling water temperature Tw is lower than the second threshold temperature Tw2. When Tw<Tw2, the routine proceeds to step 202 where the second warmup processing is performed. At the next step 203, it is judged if the cooling water temperature Tw is equal to or higher than the target temperature Twt. When Tw<Twt, the routine returns to step 202. When Tw≥Twt, next the routine proceeds to step 204 where the second warmup processing is stopped. Next, the routine returns to step 200.

When Tw≥Tw1, the routine proceeds to step 205 where the first threshold temperature Tw1 is calculated. At the next step 206, it is judged if the cooling water temperature Tw is lower than the first threshold temperature Tw1. When Tw≥Tw1, the routine returns to step 200. At this time, warmup processing is not performed. When Tw<Tw1, the routine proceeds to step 207 where the first warmup processing is performed. At the next step 208, it is judged if the cooling water temperature Tw is equal to or higher than the target temperature Twt. When Tw<Twt, the routine returns to step 207. When Tw≥Twt, next the routine proceeds to step 204 where the first warmup processing is stopped.

Note that, as will be understood from the routine of FIG. 16, there may be a case where both the first threshold temperature Tw1 and the second threshold temperature Tw2 are not calculated.

Next, a fourth embodiment of warmup control according to the present disclosure will be explained. Explaining the points of difference from the third embodiment of warmup control according to the present disclosure, in the fourth embodiment of warmup control according to the present disclosure, third warmup processing is performed in addition to the first warmup processing and the second warmup processing. The third warmup processing is similar to the third warmup processing in the second embodiment of warmup control according to the present disclosure, so the explanation will be omitted.

Figure 17:
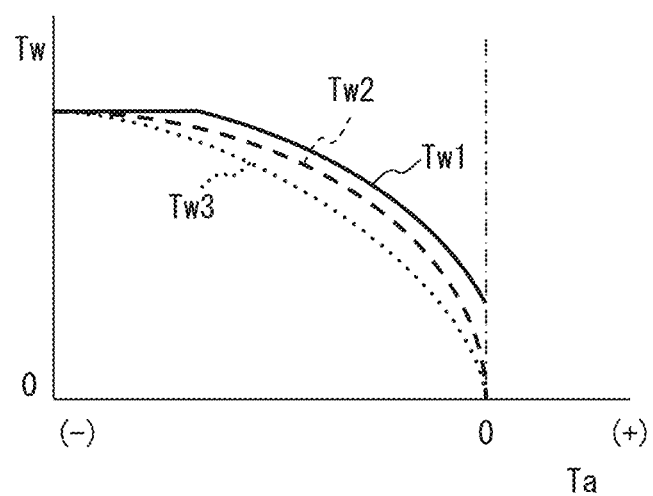
FIG. 17 is a graph for explaining a fourth embodiment of warmup control according to the present disclosure.

In the fourth embodiment of warmup control according to the present disclosure, in addition to the first threshold temperature Tw1 and the second threshold temperature Tw2, a third threshold temperature Tw3 lower than the second threshold temperature Tw2 is calculated. This third threshold temperature Tw3 is determined based on the outside air temperature Ta. Specifically, as shown in FIG. 17, when the outside air temperature Ta is high, the third threshold temperature Tw3 is lower compared with when the outside air temperature Ta is low. Note that, the third threshold temperature Tw3 is stored as a function of the outside air temperature Ta in advance in the memory 93.

In the fourth embodiment of warmup control according to the present disclosure, when the cooling water temperature Tw is lower than the third threshold temperature Tw3, the third warmup processing is performed. When the cooling water temperature Tw is higher than the third threshold temperature Tw3 and lower than the second threshold temperature Tw2, the second warmup processing is performed. When the cooling water temperature Tw is higher than the second threshold temperature Tw2 and lower than the first threshold temperature Tw1, the first warmup processing is performed. When the cooling water temperature Tw is higher than the first threshold temperature Tw1, the warmup processing is not performed. As a result, the energy consumption due to warmup processing is further reduced while freezing of the fuel cell system 1 is further reliably limited.

In the fourth embodiment of warmup control according to the present disclosure, when the third warmup processing should be performed, the boost voltage VB is lowered from the base boost voltage VBB to the lowered boost voltage VBL and the output voltage Vfc of the fuel cell 10 is lowered from the base output voltage VfcB to the third output voltage Vfc3. In this case, in the same way as the second embodiment of warmup control according to the present disclosure, boost voltage VB and the output voltage Vfc of the fuel cell 10 are changed so that the output voltage Vfc of the fuel cell 10 is maintained higher than the input lower limit VinLL of the boost converter 81.

Figure 18:
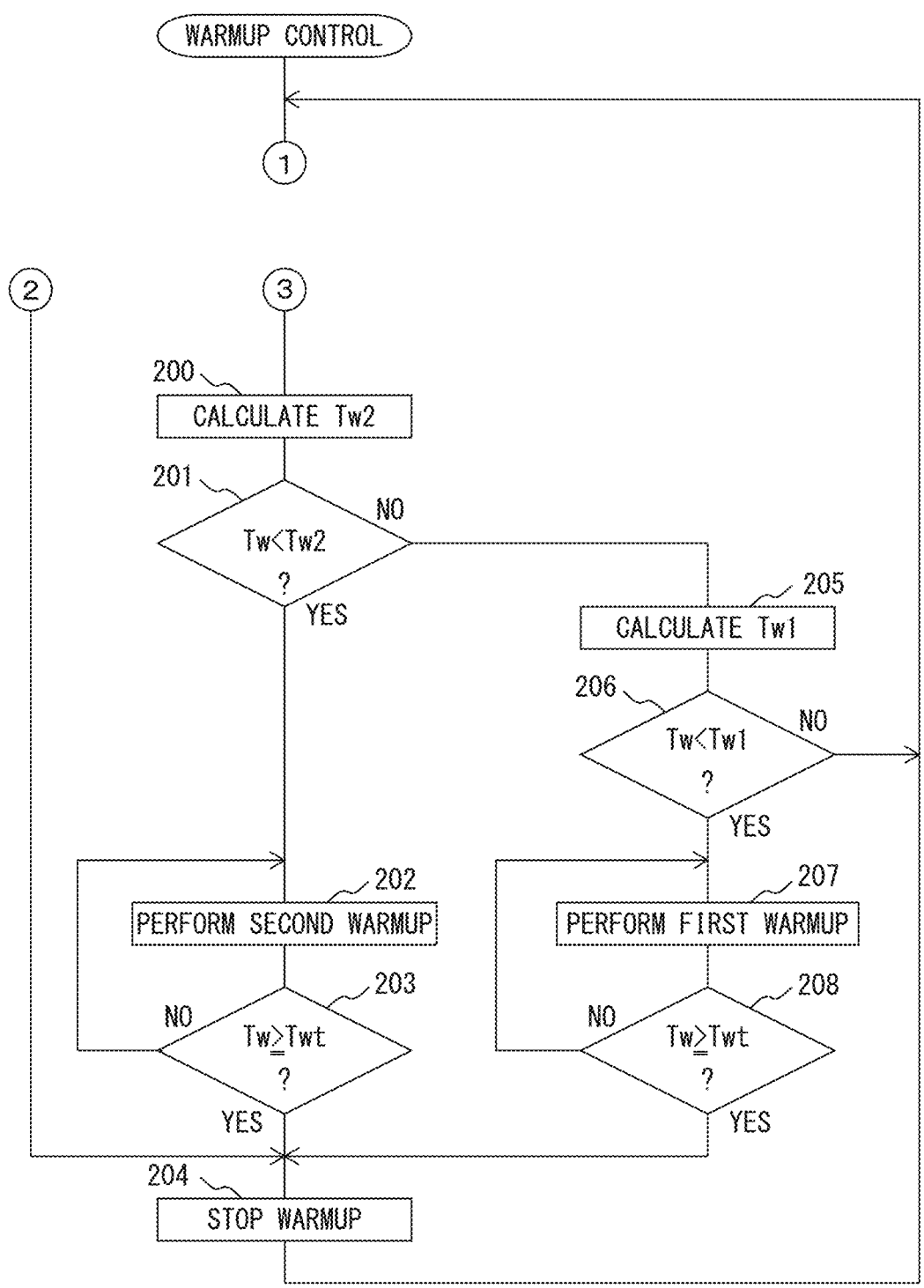
FIG. 18 is a flow chart showing a routine for performing the fourth embodiment of warmup control according to the present disclosure.
Figure 19:
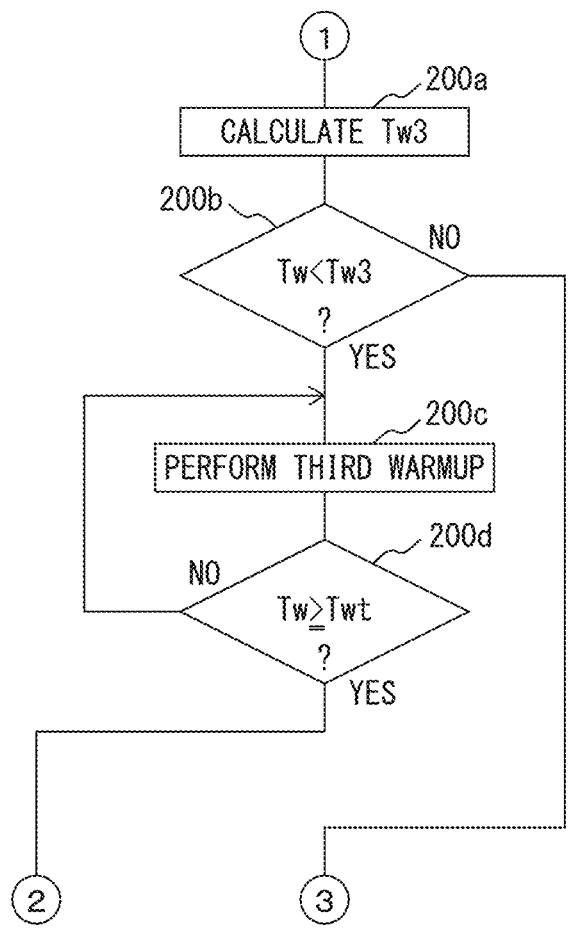
FIG. 19 is a flow chart showing a routine for performing the fourth embodiment of warmup control according to the present disclosure.

FIG. 18 and FIG. 19 show the routine for performing the fourth embodiment of warmup processing according to the present disclosure. Explaining the points of difference from the routine shown in FIG. 16, in the routine shown in FIG. 18 and FIG. 19, first, at step 200a, the third threshold temperature Tw3 is calculated. At the next step 200b, it is judged if the cooling water temperature Tw is lower than the third threshold temperature Tw3. When Tw<Tw3, the routine proceeds to step 200c where the third warmup processing is performed. At the next step 200d, it is judged if the cooling water temperature Tw is equal to or higher than the target temperature Twt. When Tw<Twt, the routine returns to step 200c. When Tw≥Twt, next the routine proceeds to step 204 where the third warmup processing is stopped. Next, the routine is returned to step 200a. When Tw≥Tw3, the routine proceeds from step 200b to step 200.

Figure 20:
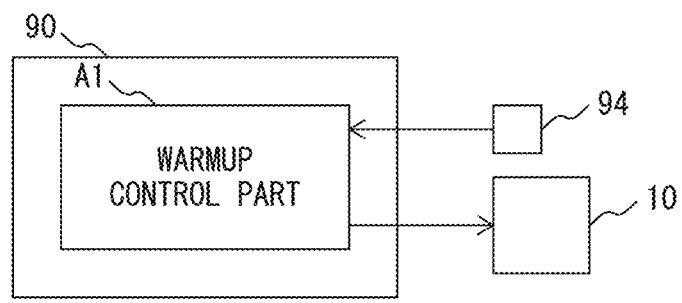
FIG. 20 is a functional block diagram of an electronic control unit in the first embodiment and second embodiment, etc. of warmup control according to the present disclosure.

Therefore, if comprehensively expressing the first embodiment and the second embodiment of warmup control according to the present disclosure, as shown by the functional block diagram of the electronic control unit 90 of FIG. 20, there is provided a fuel cell system (1), comprising a fuel cell (10), a sensor (94) configured to detect a temperature (Tw) of the fuel cell (10), and a warmup control part (A1) configured to perform first warmup processing when it is judged that the temperature (Tw) of the fuel cell (10) is lower than a predetermined threshold temperature (Tw1) and to perform second warmup processing with an amount of heat generation greater than the first warmup processing when it is judged that the temperature (Tw) of the fuel cell (10) has fallen during the first warmup processing.

Figure 21:
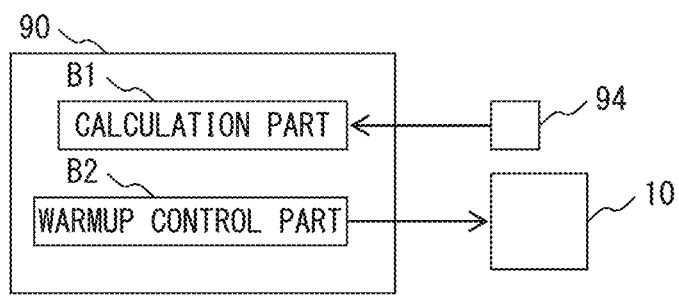
FIG. 21 is a functional block diagram of an electronic control unit in the third embodiment and fourth embodiment, etc. of warmup control according to the present disclosure.

Further, if comprehensively expressing the third embodiment and the fourth embodiment of warmup control according to the present disclosure, as shown by the functional block diagram of the electronic control unit 90 of FIG. 21, there is provided a fuel cell system (1), comprising a fuel cell (10), sensors (94) configured to detect a temperature (Tw) of the fuel cell (10) and an outside air temperature (Ta), a calculation part (B1) configured to calculate a first threshold temperature (Tw1) and a second threshold temperature (Tw2) lower than the first threshold temperature (Tw1), based on the outside air temperature (Ta), and a warmup control part (B2) configured to perform first warmup processing when it is judged that the temperature (Tw) of the fuel cell (10) is lower than the first threshold temperature (Tw1) and higher than the second threshold temperature (Tw2) and to perform second warmup processing with an amount of heat generation greater than the first warmup processing when it is judged that the temperature (Tw) of the fuel cell (10) is lower than the second threshold temperature (Tw2).

Figure 22:
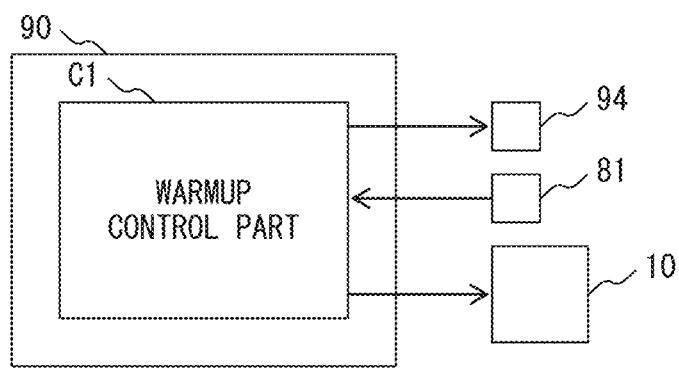
FIG. 22 is a functional block diagram of an electronic control unit in the second embodiment and fourth embodiment, etc. of warmup control according to the present disclosure.

Furthermore, if comprehensively expressing the second embodiment and the fourth embodiment of warmup control according to the present disclosure comprehensively, as shown by the functional block diagram of the electronic control unit 90 of FIG. 22, there is provided a fuel cell system (1), comprising a fuel cell (10) having a variable output voltage (Vfc), a boost converter (81) configured to raise an output voltage (Vfc) of the fuel cell (10) to a boost voltage (VB), the boost converter (81) having a variable boost voltage (VB), and a warmup control part (C1) configured to perform first warmup processing (third warmup processing), in which the fuel cell (10) is operated with the boost voltage (VB) of the boost converter (81) being set to a lowered boost voltage (VBL) lower than the base boost voltage (VBB) and the output voltage (Vfc) of the fuel cell (10) being set to a first output voltage (Vfc3) lower than a base output voltage (VfcB), wherein the first output voltage (Vfc3) is lower than an input lower limit (VinLL (VBB)) of the boost converter when the boost voltage (VB) of the boost converter (81) is the base boost voltage (VBB), and is higher than the input lower limit (VinLL (VBL)) of the boost converter (81) when the boost voltage (VB) of the boost converter (81) is the lowered boost voltage (VBL).

REFERENCE SIGNS LIST 1. fuel cell system
10. fuel cell
81. boost converter
90. electronic control unit
94. sensor
A1, B2, C1. warmup control part
B1. calculation part

The invention claimed is:

1. A fuel cell system, comprising
    a fuel cell,
    a sensor configured to detect a temperature of the fuel cell, and
    a warmup control part configured to perform first warmup processing when it is judged that the temperature of the fuel cell is lower than a predetermined threshold temperature and to perform second warmup processing with an amount of heat generation greater than the first warmup processing when it is judged that the temperature of the fuel cell has fallen during the first warmup processing.

2. The fuel cell system according to claim 1, wherein the warmup control part is configured to perform third warmup processing with an amount of heat generation greater than the second warmup processing when it is judged that the temperature of the fuel cell has fallen during the second warmup processing.

3. A fuel cell system, comprising
    a fuel cell,
    sensors configured to detect a temperature of the fuel cell and an outside air temperature,
    a calculation part configured to calculate a first threshold temperature and a second threshold temperature lower than the first threshold temperature, based on the outside air temperature, and
    a warmup control part configured to perform first warmup processing when it is judged that the temperature of the fuel cell is lower than the first threshold temperature and higher than the second threshold temperature and to perform second warmup processing with an amount of heat generation greater than the first warmup processing when it is judged that the temperature of the fuel cell is lower than the second threshold temperature.

4. The fuel cell system according to claim 3, wherein
the calculation part is further configured to calculate a third threshold temperature lower than the second threshold temperature based on the outside air temperature, and
the warmup control part is further configured to perform the second warmup processing when it is judged that the temperature of the fuel cell is lower than the second threshold temperature and higher than the third threshold temperature and third warmup processing with an amount of heat generation greater than the second warmup processing when it is judged the temperature of the fuel cell is lower than the third threshold temperature.

5. A fuel cell system, comprising
a fuel cell having a variable output voltage,
a boost converter configured to raise an output voltage of the fuel cell to a boost voltage, the boost converter having a variable boost voltage, and
a warmup control part configured to perform first warmup processing, in which the fuel cell is operated with the boost voltage of the boost converter being set to a lowered boost voltage lower than the base boost voltage and the output voltage of the fuel cell being set to a first output voltage lower than a base output voltage,
wherein the first output voltage is lower than an input lower limit of the boost converter when the boost voltage of the boost converter is the base boost voltage, and is higher than the input lower limit of the boost converter when the boost voltage of the boost converter is the lowered boost voltage.

6. The fuel cell system according to claim 5, wherein
the warmup control part is further configured to perform second warmup processing, in which the fuel cell is operated with the boost voltage of the boost converter being set to the base boost voltage and the output voltage of the fuel cell being set to a second output voltage lower than the base output voltage and higher than the first output voltage, and to switch from the second warmup processing to the first warmup processing, and
the warmup control part is further configured to change the output voltage of the fuel cell and the boost voltage of the boost converter so that the output voltage of the fuel cell is maintained higher than the input lower limit of the boost converter when switching from the second warmup processing to the first warmup processing.

7. The fuel cell system according to claim 6, further comprising
a sensor configured to detect a temperature of the fuel cell,
wherein the warmup control part is further configured to perform first warmup processing when it is judged that the temperature of the fuel cell has fallen during second warmup processing.

8. The fuel cell system according to claim 6, wherein the warmup control part is further configured to perform third warmup processing, in which the fuel cell is operated with the boost voltage of the boost converter being set to the base boost voltage and the output voltage of the fuel cell being set to a third output voltage lower than the base output voltage and higher than the second output voltage, and to switch from the third warmup processing to the second warmup processing.

9. The fuel cell system according to claim 8, further comprising
a sensor configured to detect a temperature of the fuel cell,
wherein the warmup control part is further configured to perform second warmup processing when it is judged that the temperature of the fuel cell has fallen during third warmup processing.

10. A method of controlling a fuel cell system, comprising
detecting a temperature of the fuel cell by a sensor, and
performing first warmup processing when it is judged that the temperature of the fuel cell is lower than a predetermined threshold temperature, and performing second warmup processing with an amount of heat generation greater than the first warmup processing when it is judged that the temperature of the fuel cell has fallen during the first warmup processing.

11. A method of controlling a fuel cell system, comprising
detecting a temperature of the fuel cell by a sensor,
calculating a first threshold temperature and a second threshold temperature lower than the first threshold temperature, based on the outside air temperature, and
performing first warmup processing when it is judged that the temperature of the fuel cell is lower than the first threshold temperature and higher than the second threshold temperature and to perform second warmup processing with an amount of heat generation greater than the first warmup processing when it is judged that the temperature of the fuel cell is lower than the second threshold temperature.

12. A method of controlling a fuel cell system, the fuel cell system including
a fuel cell having a variable output voltage and
a boost converter configured to raise an output voltage of the fuel cell to a boost voltage, the boost converter having a variable boost voltage,
the method comprising
performing first warmup processing, in which the fuel cell is operated with the boost voltage of the boost converter being set to a lowered boost voltage lower than the base boost voltage and the output voltage of the fuel cell being set to a first output voltage lower than a base output voltage,
wherein the first output voltage is lower than an input lower limit of the boost converter when the boost voltage of the boost converter is the base boost voltage, and is higher than the input lower limit of the boost converter when the boost voltage of the boost converter is the lowered boost voltage.

* * * * *